3,277,175
PREPARATION OF p-NITRODIPHENYLAMINES
Milton Lewis Clemens, Jr., Kingsport, Tenn., assignor to Eastman Kodak Company, Rochester, N.Y., a corporation of New Jersey
No Drawing. Filed Nov. 26, 1963, Ser. No. 326,259
4 Claims. (Cl. 260—576)

This invention relates to an improvement in the preparation of p-nitrodiphenylamines which may be represented by the structural formula:

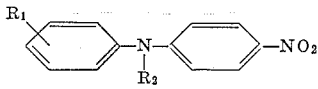

wherein $R_1$ is a substituent selected from the group consisting of hydrogen, halogen, alkyl, phenyl, nitrophenyl, nitro, alkoxy, aryloxy, α-naphthyl, and toluyl groups and $R_2$ is a substituent selected from the group consisting of hydrogen and alkyl. More specifically the invention relates to an improvement in the process of preparing p-nitrodiphenylamine by the reaction between p-nitrochlorobenzene and aniline or a substituted aniline. It is known to produce p-nitrodiphenylamine in accordance with the following equation:

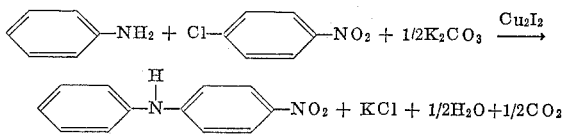

This method is disclosed in British Patent 24,091, in German Patent 185,663 and in French Patent 381,230. Conversions of p-nitrodiphenylamines obtained in accordance with these disclosures were exceedingly small representing only about one percent of theory. The process was improved upon by Merz who in U.S. Patent 2,927,943 describes a process whereby he was enabled to obtain conversions up to about 73 percent of theory by employing anhydrous conditions in the reaction by azeotropic removal of water produced therein without appreciable change in reaction time or temperature. In German Auslegeschrift 1,090,225, Merz also discloses the use of amides, such as dimethylformamide and hexamethylphosphortriamide to materially shorten the reaction time. Conversions of up to about 78 percent of theory were said to be obtained by this expedient. I have now found that the Merz process, particularly that disclosed in U.S. Patent 2,927,943, may be improved upon with an appreciable increase in conversions and a shortened reaction time by employing dimethyl sulfoxide as a reaction accelerator. So far as I am aware, the use of this compound as an accelerator for this reaction is not disclosed in the chemical or patent literature.

The present invention, accordingly, has as an object to provide an improved process for the preparation of p-nitrodiphenylamine, either as p-nitrodiphenylamine itself or its substituted derivatives.

A further object is to provide an improved process involving the reaction between p-nitrochlorobenzene and aniline or a substituted aniline when carried out in the process of potassium carbonate as a hydrochloric acid acceptor and in the presence of a copper catalyst, and a water withdrawing agent wherein conversions to the desired p-nitrodiphenylamine or substituted p-nitrodiphenylamines may be substantially increased and the reaction time may be substantialy reduced.

A still further object is to provide a process such as described in the preceding paragraph and from which the volatiles recovered from the process and consisting principally of unused aniline or substituted aniline, the water withdrawing agent, and the reaction accelerator may be reused to produce further amounts of the p-nitrodiphenylamine product and thus effect a substantial economy in the overall operation of the process.

Other objects will appear hereinafter.

These objects are accomplished by the following invention which is based upon the discovery that if one adds a small amount of dimethyl sulfoxide to a reaction mixture comprising p-nitrochlorobenzene and aniline, or a substituted aniline, potassium carbonate as a hydrochloric acid acceptor, a copper catalyst such as cuprous iodide ($Cu_2I_2$) and an azeotropic water withdrawing agent such as toluene, benzene, various xylenes and the like, and carries out the reaction under the influence of heat and under substantially anhydrous conditions by continuously removing the water formed in the reaction as a constant boiling mixture with the withdrawing agent, the reaction rate is substantially accelerated and improved conversion of p-nitrodiphenylamine product is obtained. The basic reaction for carrying out the process of the invention is similar to that given above but is distinguished therefrom by the fact of employment in the reaction mixture of dimethyl sulfoxide as a reaction accelerator. The reaction may then be represented as follows:

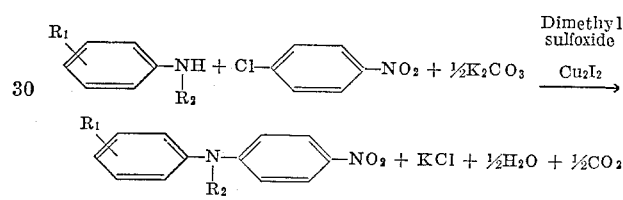

As indicated above, the starting materials are p-nitrochlorobenzene and aniline or a substituted aniline having the structural formula

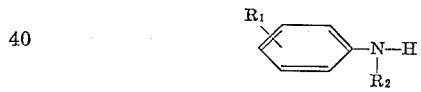

wherein $R_1$ is a substituent selected from the group consisting of hydrogen, halogen, alkyl, phenyl, nitrophenyl, nitro, alkoxy, aryloxy, α-naphthyl, and toluyl groups and $R_2$ is a substituent selected from the group consisting of hydrogen and alkyl.

The temperature employed for carrying out the above reaction in accordance with the invention is within the range of 165–210° C. and in a preferred embodiment may be within the range of 186–189° C. The temperature can be varied rather widely depending upon the particular conditions of operation, the apparatus employed for carrying out the reaction and various other factors.

As indicated, the distinguishing feature of the invention is the fact that dimethyl sulfoxide is employed as a reaction accelerator. While relatively small amounts of the material are effective in obtaining increased conversions in accordance with our process, the actual amount of the accelerator employed may vary over a very wide range. In a preferred embodiment of the invention there may be employed from 0.2 mole to 0.6 mole of dimethyl sulfoxide per mole of p-nitrochlorobenzene. Although larger amounts of the accelerator may be employed, because of the expensive nature of the material, it is preferable to use no more than is required under the conditions of operation to bring about the desired results.

In the following examples and description I have set forth several of the preferred embodiments of my invention but they are included merely for purposes of illustration and not as a limitation thereof.

Example I

A charge of 1 gram of cuprous iodide ($Cu_2I_2$), 78.8 grams p-nitrochlorobenzene, 93 grams aniline, 40 grams potassium carbonate, 16.5 grams dimethyl sulfoxide and 21 grams toluene was placed in a reaction vessel equipped with a mechanically driven stirrer and a Dean-Stark tube, as for example, an apparatus similar to that disclosed in U.S. Patent 2,927,943. The charge was stirred with azeotropic distillation for 9 hours at 186–188° C. during which time 7 grams of water were collected in the decanter. During this period 4.3 grams of toluene were added, as needed, to maintain the reaction temperature constant. The volatiles consisting of unused aniline, toluene, and the reaction accelerator (which itself does not enter into the reaction) were removed then by vacuum distillation until a base temperature of 168° C. was reached at 1 mm. of mercury pressure. The recovered volatiles weighed 84 grams. The distillation residue was taken up in hot acetone and filtered, using a diatomaceous earth filter aid and warm acetone wash, and the filtrate was dried to yield 103.8 grams of crude p-nitrodiphenylamine of 90.5 percent assay. The assay conversion then was 87.6 percent of the theoretical.

Example II

As illustrating the fact that the volatiles from a previous run may be reused in accordance with the invention, a charge of 81.2 grams of the volatile recovery from Example I, 78.8 grams p-nitrochlorobenzene, 1 gram cuprous iodide, 47 grams aniline, 40 grams potassium carbonate and 5.5 grams dimethyl sulfoxide was placed in an apparatus such as described in Example I and stirred with azeotropic distillation for 10 hours at 186–189° C. while 7.2 grams of water were being collected in the decanter. During the reaction period 6 grams of toluene were added, as needed, to maintain the reaction temperature constant. The reaction mixture was processed like Example I to give 89.9 grams of recovered volatiles and 104.6 grams of crude p-nitrodiphenylamine of 86 percent assay. The assay conversion here was 84.1 percent of the theoretical.

Example III

As further illustrating the reuse of volatiles from a previous run, a charge of 89.5 grams of the volatile recovery from Example II, 78.8 grams p-nitrochlorobenzene, 1 gram cuprous iodide, 47 grams aniline and 40 grams potassium carbonate was stirred was azeotropic distillation for 10.5 hours at 186–188° C. while 6.4 grams of water were being collected in the decanter. During the reaction period 4.8 grams of toluene were added, as needed, to maintain the reaction temperature constant. The reaction mixture was processed like Example I, with the exception that a base temperature of 173° C. was reached, to give 88 grams of recovered volatiles and 104.4 grams of crude p-nitrodiphenylamine of 91 percent assay. The assay conversion here was 88.8 percent of the theoretical.

Example IV

This example is given to illustrate the results of reaction without use of dimethyl sulfoxide. A charge of 1 gram cuprous iodide, 78.8 grams p-nitrochlorobenzene, 129.5 grams aniline, 36.5 grams potassium carbonate and 21.6 grams toluene was stirred with azeotropic distillation for 22 hours at 184–189° C. during which time 5.1 grams of water were collected in the decanter. During this period 4.3 grams of toluene were added, as needed, to maintain the reaction temperature constant. This batch was processed by steam distillation to remove toluene, excess aniline and unreacted p-nitrochlorobenzene followed by cooling of the aqueous slurry, filtering and drying. A weight yield of 94.5 grams crude p-nitrodiphenylamine of 87.5 percent assay thus was obtained. The assay conversion then was 77.3 percent of the theoretical.

It will be apparent from the above examples that by the present invention there is provided a simple and effective means of increasing the conversions to be obtained in the production of p-nitrodiphenylamine by my process and also of substantially reducing the reaction time involved over comparable processes of the prior art as discussed above. It will also be observed that economies of manufacture are made possible by the fact that the volatiles recovered from the process may be reused in the production of further quantities of p-nitrodiphenylamine without anything more than addition of the water withdrawing agent as required to maintain the reaction temperature constant and make-up aniline or substituted aniline to replace that used up in the previous reaction.

The nitrodiphenylamines prepared by the method of this invention are useful as intermediates in the synthesis of N,N′-disubstituted p-phenylenediamines many of which are valuable as rubber antiozonants and gasoline inhibitors.

Although the invention has been described in considerable detail with particular reference to certain preferred embodiments thereof, variations and modifications can be effected within the spirit and scope of the invention as described hereinabove, and as defined in the appended claims.

I claim:

1. In the process of preparing a p-nitrodiphenylamine having the structural formula

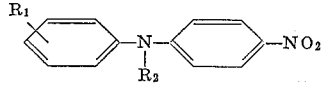

wherein $R_1$ is a substituent selected from the group consisting of hydrogen, halogen, alkyl, phenyl, nitrophenyl, nitro, alkoxy, aryloxy, α-naphthyl, and toluyl groups and $R_2$ is a substituent selected from the group consisting of hydrogen and alkyl which comprises reacting p-nitrochlorobenzene with at least a molar equivalent of an aromatic amine having the structural formula

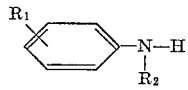

wherein $R_1$ is a substituent selected from the group consisting of hydrogen, halogen, alkyl, phenyl, nitrophenyl, nitro, alkoxy, aryloxy, α-naphthyl, and toluyl groups and $R_2$ is a substituent selected from the group consisting of hydrogen and alkyl in the presence of a catalytic amount of a copper salt, at least a stoichiometric amount of potassium carbonate as a hydrochloric acid acceptor and a water withdrawing agent, at a temperature within the range of 165–200° C. wherein hydrochloric acid is produced in the reaction and wherein water formed by neutralization of the hydrochloric acid is continuously removed azeotropically whereby anhydrous conditions are maintained in the reaction mixture, the improvement which comprises employing dimethyl sulfoxide in the reaction mixture as a reaction accelerator.

2. In the process of preparing p-nitrodiphenylamine by reacting p-nitrochlorobenzene with at least a molar equivalent of aniline in the presence of a catalytic amount of cuprous iodide, at least a stoichiometric amount of potassium carbonate as a hydrochloric acid acceptor and an azeotropic water withdrawing agent, at a temperature within the range of 165–210° C. wherein hydrochloric acid is produced in the reaction and wherein water formed by neutralization of the hydrochloric acid is continuously removed azeotropically and anhydrous conditions are maintained in the reaction mixture, the improvement which comprises employing dimethyl sulfoxide in the reaction mixture as a reaction accelerator.

3. In the process of preparing p-nitrodiphenylamine by reacting p-nitrochlorobenzene with at least a molar equivalent of aniline in the presence of a catalytic amount of cuprous iodide, at least a stoichiometric amount of potassium carbonate as a hydrochloric acid acceptor and toluene as an azeotropic water withdrawing agent, at a temperature within the range of 186–189° C. wherein hydrochloric acid is produced in the reaction and wherein water formed by neutralization of the hydrochloric acid is continuously removed as a constant boiling mixture of water and withdrawing agent whereby anhydrous conditions are maintained in the reaction mixture, the improvement which comprises employing dimethyl sulfoxide in the reaction mixture as a reaction accelerator.

4. In the process of preparing p-nitrodiphenylamine by reacting one mole of p-nitrochlorobenzene with 1–10 moles of aniline in the presence of a catalytic amount of cuprous iodide, at least a stoichiometric amount of potassium carbonate as a hydrochloric acid acceptor and toluene as an azeotropic water withdrawing agent, at a temperature within the range of 186–189° C. wherein hydrochloric acid is produced in the reaction and wherein water formed by neutralization of the hydrochloric acid is continuously removed as a constant boiling mixture of water and toluene whereby anhydrous conditions are maintained in the reaction mixture, the improvement which comprises employing about 0.2 to about 0.6 mole of dimethyl sulfoxide per mole of p-nitrochlorobenzene as a reaction accelerator.

References Cited by the Examiner
UNITED STATES PATENTS 3,055,940　9/1962　Merz _____ 260—576

OTHER REFERENCES

Finger et al., "Journal American Chemical Society," vol. 78, pp. 6034–7 (1956).

Ross et al., "Journal American Chemical Society," vol. 83, pp. 2133–6 (1961).

CHARLES B. PARKER, *Primary Examiner.*

ROBERT V. HINES, *Assistant Examiner.*